April 5, 1966
J. ERDODY
3,244,300
BOAT TRAILER EXTENSION
Filed Oct. 28, 1963
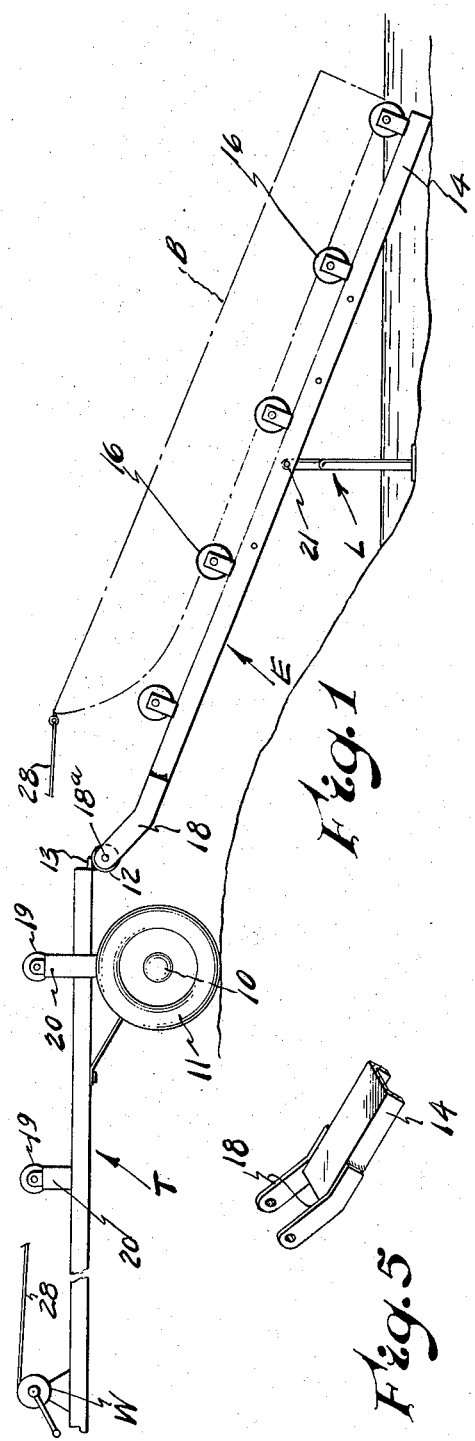
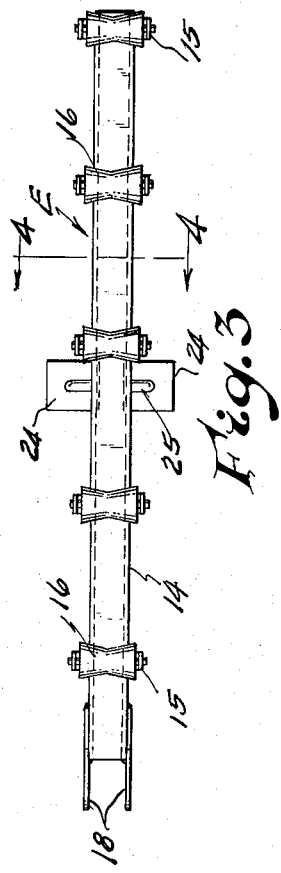
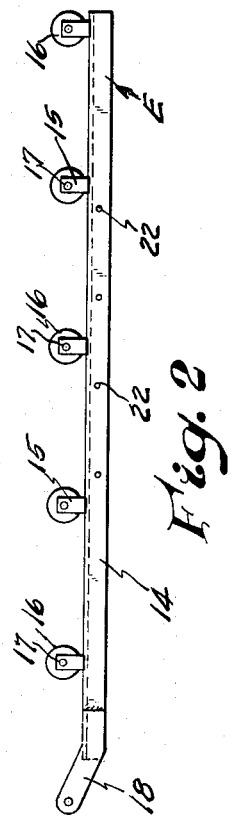
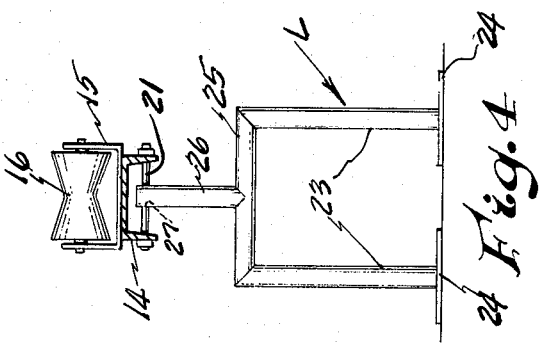
INVENTOR.
John Erdody
BY
Searman Searman † McCulloch.
ATTORNEYS

United States Patent Office 3,244,300
Patented Apr. 5, 1966

3,244,300
BOAT TRAILER EXTENSION
John Erdody, 301 Blondin St., Pinconning, Mich.
Filed Oct. 28, 1963, Ser. No. 319,472
2 Claims. (Cl. 214—85)

This invention relates to boat trailer extensions for use in drawing a boat from the water and loading it on a boat trailer or the like, or for launching from a trailer into the water.

One of the prime objects of the invention is to design a very simple, practical and economical extension member which can be readily placed in position for positioning a boat thereon, and then pulled upward and properly positioned on a boat trailer.

Another object of the invention is to provide a simple, lightweight extension member which maintains the boat in alignment with the trailer onto which the boat is loaded and which can be positioned and guided by one person.

A further object is to design a boat trailer extension having a set of resilient supporting rollers for supporting the weight of the boat and engaging the hull at a plurality of points, so that the hull is never subjected to excessive strain by any one support or at any one point or points.

Still a further object is to provide an extension of simplified and rugged construction which is extremely easy to operate, affords adequate support for the boat in all adjusted positions of the latter, and which is relatively inexpensive to manufacture and assemble.

A further object still is to provide a supporting leg adjustably connected to the extension member for support and stabilization of the structure as the boat is being loaded or unloaded.

Still a further object is to provide an extension member for loading and launching boats, which maintains the boat in alignment with the trailer during the entire loading or launching operation even if there is a current and the water is rough.

With the above and other objects in view, the present invention consists in the combination and arrangement of parts, hereinafter more fully described, illustrated in the accompanying drawing, and more particularly pointed out in the appended claims; it being understood that changes may be made in the form, size, proportion and minor details of construction, without departing from the spirit, or sacrificing any of the advantages of the invention.

In the drawing:

FIG. 1 is a side elevational view, showing a boat trailer of typical construction, with the extension member attached thereto and a boat mounted thereon.

FIG. 2 is an enlarged, side elevational view of the extension member.

FIG. 3 is a top plan view thereof showing a leg support attached thereto.

FIG. 4 is an enlarged, transverse, sectional view taken on the line 4—4 of FIG. 3 showing the support in position.

FIG. 5 is a perspective detail showing the connection of the extension tongue to the trailer.

Referring now more particularly to the drawing in which I have shown the preferred embodiment of my invention.

The letter T indicates a conventional trailer such as used in hauling boats from one location to another and comprises a rear axle 10 having wheels 11 as usual, and a centrally disposed, cylindrical section 12 is welded or otherwise secured to the lower face of the rear end of the trailer frame or plate 13, and for a purpose to be hereinafter more fully described.

An extension member E is detachably secured to the rear end of the trailer frame and includes, a standard channel member 14 on which a plurality of U-shaped brackets 15 are secured in longitudinally spaced apart relation, either by riveting or welding as desired.

Oppositely tapered rollers 16 are mounted on said brackets 15 by means of bolts 17, these rollers being preferably formed of rubber or other semi-soft material to eliminate any marking or damage to the hull of the boats being handled.

A pair of bar members 18 are welded to the front end of the extension member E to form a tongue and are upwardly inclined as shown, being provided with bolt 18a to permit the extension member to be readily secured to the cylindrical section 12 and form the conveyor over which the boat "B" is drawn during the loading or unloading operation, and rollers 19 are mounted on brackets 20 provided on the trailer frame and on which the boat is positioned when loaded.

A preferably fabricated attachable and detachable leg L is connected to the extension member E at a point intermediate its length by means of a bolt 21 which extends through one of the openings 22 provided in the legs of the extension member, said leg comprising a pair of vertically projecting sections 23 having bearing plate 24 on the lower ends thereof, a transversely disposed, horizontal member 25 connects the upper ends of said vertical sections 23, and a vertically disposed section 26 extends from the member 25 and is provided with an opening 27 directly adjacent its upper end to accommodate the bolt 21, there being a plurality of longitudinally spaced apart openings 22 in the legs, so that the leg E may be mounted as desired.

A conventional winding winch W is mounted in the forward end of the trailer T and includes a cable 28 which is connected to the boat, so that upon operation of the winch, the boat can be readily pulled to position on the trailer.

From the foregoing description, it will be obvious that I have perfected a very simple, practical and economical extension for use in launching and removing boats from the water.

I claim:

1. A boat trailer extension member comprising, an inverted, U-shaped, horizontally disposed channel member of predetermined length having a smooth upper face; U-shaped brackets mounted on the smooth upper face of said channel member in longitudinally spaced apart relation; rollers journaled on said brackets; angularly disposed tongue straps secured to the depending legs of the channel member at one end thereof and adapted to be detachably secured to a trailer; and a detachable supporting leg structure pivotally secured to the legs of said channel member at a point substantially midway of the length thereof to form an intermediate support for said extension member.

2. The combination defined in claim 1 in which the detachable supporting leg structure comprises; transversely spaced apart legs having enlarged flat bearing members on the lower end thereof, a horizontally disposed member connecting the upper ends of said legs, and a vertical section connecting said horizontally disposed member with the legs of said channel member.

References Cited by the Examiner
UNITED STATES PATENTS

| | | | |
|---|---|---|---|
| 2,716,499 | 8/1955 | Grant | 214—84 |
| 2,754,017 | 7/1956 | Hart et al. | 214—84 X |
| 3,077,277 | 2/1963 | Holzman | 214—84 |
| 3,113,654 | 12/1963 | Kirsch | 193—35 |

GERALD M. FORLENZA, Primary Examiner.

A. J. MAKAY, Assistant Examiner.